(12) United States Patent
Clark (10) Patent No.: US 6,624,899 B1
(45) Date of Patent: Sep. 23, 2003

(54) TRIANGULATION DISPLACEMENT SENSOR

(75) Inventor: R. Robert Clark, Redwood City, CA (US)

(73) Assignee: Schmitt Measurement Systems, Inc., Portland, OR (US)

( * ) Notice: Subject to any disclaimer, the term of this patent is extended or adjusted under 35 U.S.C. 154(b) by 49 days.

(21) Appl. No.: 09/606,849

(22) Filed: Jun. 29, 2000

(51) Int. Cl.[7] .............................................. G01B 11/14
(52) U.S. Cl. ........................................ 356/614; 356/623
(58) Field of Search ................................ 356/601, 602, 356/603, 606, 607, 612, 614, 622, 623; 250/559.19, 559.22, 559.23, 559.29, 559.31

(56) References Cited

U.S. PATENT DOCUMENTS

| | | | |
|---|---|---|---|
| 4,040,738 A | 8/1977 | Wagner | 356/1 |
| 4,146,327 A | 3/1979 | Harris | 356/1 |
| 4,248,352 A | 2/1981 | White | 211/88 |
| 4,373,804 A | 2/1983 | Pryor et al. | 356/1 |
| 4,541,721 A * | 9/1985 | Dewar | 356/623 |
| 4,553,836 A * | 11/1985 | Meier et al. | 356/5 |
| 4,743,771 A * | 5/1988 | Sacks et al. | 250/559.22 |
| 5,362,970 A | 11/1994 | Pryor et al. | 250/561 |
| 5,510,625 A | 4/1996 | Pryor et al. | 250/559.23 |
| 5,625,451 A | 4/1997 | Schiff et al. | 356/236 |
| 5,661,556 A | 8/1997 | Schiff et al. | 356/236 |
| 5,670,787 A | 9/1997 | Pryor et al. | 250/559.31 |
| 5,734,172 A | 3/1998 | Pryor et al. | 250/559.23 |
| 5,800,247 A | 9/1998 | Harms | 451/5 |
| 5,854,491 A | 12/1998 | Pryor et al. | 250/559.31 |
| 5,973,839 A * | 10/1999 | Dorsel | 359/599 |
| 5,981,965 A | 11/1999 | Pryor et al. | 250/559.23 |
| RE36,560 E * | 2/2000 | Svetkoff et al. | 356/376 |
| 6,062,948 A | 5/2000 | Schiff et al. | 451/9 |
| 6,069,905 A * | 5/2000 | Davis et al. | 372/43 |
| 6,115,111 A * | 9/2000 | Korah et al. | 356/4.01 |
| 6,252,659 B1 * | 6/2001 | Norita et al. | 356/376 |
| 6,271,918 B2 * | 8/2001 | Blais | 356/376 |

OTHER PUBLICATIONS

James P. Waters; Gaging by Remote Image Tracking; Proceeding of the Society of Photo–Optical Instrumentation Engineers vol. 153; Advances in Optical Metrology; pp 1–7.

Ian McFarlane; Development of the "Heightscan" Thickness Gauge; Proceedings of a Symposium on Industrial Applications of Solid State Image Scanners; pp 50–55.

T.A. Clarke et al.; Laser–Based Triangulation Techniques in Optical Inspection of Industrial Structures; SPIE vol. 1332 Optical Testing and Metrology III: Recent Advances in Industrial Optical Inspection (1990); pp 474–486.

* cited by examiner

Primary Examiner—Hoa Q. Pham
(74) Attorney, Agent, or Firm—John R. Thompson; Stoel Rives LLP (57) ABSTRACT

The detector elements are larger than an image of the spot on the array would be, but an image is not formed on the array. Instead, the beam shaping element enlarges the size of the area of illumination on the array slightly, and mixes, or homogenizes, the light. This destroys the image and the intensity variations originating at the spot on the surface that would be contained in the image. The enlargement of the area of illumination together with the homogenization allow the position of the beam on the array to be determined to a resolution of about 1/10th of the width of a detector element. This position is then converted to an absolute distance output which may be read by digital or analog means.

15 Claims, 10 Drawing Sheets

TRIANGULATION DISPLACEMENT SENSOR

BACKGROUND OF THE INVENTION

1. The Field of the Invention

The invention relates to the detection of distance to an object surface. More particularly, the invention relates to a triangulation displacement sensor for the detection of distance to an object surface.

2. The Relevant Technology

The technique of triangulating distance to an object using lasers and multi-element detector linear arrays has been practiced and published since at least 1978. See, for example, I. McFarlane, Development of the Heightscan Thickness Gauge, SPIE Vol. 145, Sira, London (Mar. 14, 1978); J. Waters, Gaging by Remote Image Tracking, SPIE Vol. 153, Advances in Optical Metrology, (Aug. 28–29, 1978); and Wagner, U.S. Pat. No. 4,040,738. Distance measurement is accomplished when an optical beam is projected out from a source and strikes the object surface. The beam is then viewed by a camera that is displaced from the axis of projection of the beam by some baseline distance. The camera is angled so that the laser beam crosses the field of view of the camera. When the beam strikes a surface at a point within the field of view of the camera, light reflected from that point is typically imaged by a lens onto the camera's detector.

The detector may be either a continuous device such as a position sensing detector (PSD), which generates an electrical signal proportional to the position of the spot image on the PSD, or a linear charge coupled device (CCD) array, which consists of a single line of photodiode detector elements, each of which generates an electrical signal in proportion to the amount of light falling on it.

The signal from the camera is typically processed by a microprocessor or other electronic logic which determines the location of peak light intensity on the camera, and a calibration table and/or equation is used to translate this location among the camera's pixels to a distance from the sensor. The data is then output in a form that can be read and used by computers or displayed visually.

In the case of a linear array detector, if more than one pixel is illuminated by the image of the spot, the center of gravity, or centroid, of the spot image may be calculated to a position with resolution corresponding to a fraction of the size of a single camera pixel. Thus if the image of the spot is larger than a single pixel, the position of the object may be determined to a resolution better than that corresponding to the pixel spacing of the camera.

At the same time, it is desirable to use a small, well defined spot of light on the target so that small surface features may be resolved (see, for example, McFarlane, Waters, and Wagner, supra.). In many configurations, the small spot at the target combined with the high quality imaging lenses results in a small image spot on the detector, and the pixels of the camera must be correspondingly limited in size to facilitate centroid finding with multiple pixels illuminated. Enlarging the spot image by placing the detector array at a point other than at the image focus creates a larger illuminated area on the array, but magnifies irregular features in the image, as described below.

It is common to use a laser (see, for example, Waters, supra. and Pryor et al, U.S. Pat. No. 4,373,804) or laser diode (T. Clarke, K. Grattan, N. Lindsey, Laser-based Triangulation Techniques in Optical Inspection of Industrial Structures, SPIE Vol. 1332 Optical Testing and Metrology III: Recent Advances in Industrial Optical Inspection (1990) and Wagner, supra) light source in triangulation sensors because light from lasers may be focused to a small spot and may provide high intensity. The use of a laser introduces the difficulty that the image of the spot contains high frequency laser speckle which must be filtered out (see, for example, Pryor, supra.). Additionally, some types of laser diodes do not generate smooth intensity profiles, the light intensity being irregular and varying across the output beam. This is then evident in the image of the spot on the detector array. Finally, fine-pitch variations in reflectance from the target surface may cause the image of the spot to have irregularities.

All of the above factors create a spot image that is irregular, rather than having an intensity rising to a smooth peak and then falling off in a symmetric fashion. These irregularities can lead to inaccuracies in determining the location of the centroid of the spot, with resultant measurement error.

It would be desirable to provide an optical sensor that produces a spot image having an intensity rising to a smooth peak and then falling off in a symmetric fashion. It would also be desirable to provide a means of controlling the image spot size at the detector independent of the geometry and components of the rest of the apparatus.

BRIEF SUMMARY OF THE INVENTION

The invention provides an improved optical sensor for detecting the distance to an object surface based on triangulation. The sensor projects a beam from a laser diode through a focusing lens onto the object surface. The laser may be a VCSEL (Vertical Cavity Surface Emitting Laser) diode, which affords advantages in beam quality, intensity noise, and power consumption relative to other laser diodes.

Light scattered or reflected from the target surface is collected by a collection lens and passed through a beam shaping or homogenizing element which removes undesired intensity variations that occur in the spot at the target surface. These variations may be caused by laser speckle, structure in the output beam intensity distribution, and/or nonuniform reflectance of different regions of the object surface illuminated by the spot.

The homogenized beam then strikes a CMOS linear array detector, which converts the light intensity on its detection elements to electrical levels which are read sequentially. The detector elements are larger than an image of the spot on the array would be, but an image is not formed on the array. Instead, the beam shaping element enlarges the size of light slightly, and mixes, or homogenizes, the light. This destroys the image and the intensity variations originating at the spot on the surface that would be contained in the image.

The enlargement of the area of illumination together with the homogenization allow the position of the beam on the array to be determined to a resolution of about 1/10th of the width of a detector element. This position is then converted to an absolute distance output which may be read by digital or analog means.

These and other features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

A preferred embodiment of the invention is now described with reference to the Figures, where like reference numbers indicate identical or functionally similar elements. The components of the present invention, as generally described and illustrated in the Figures, may be implemented in a wide variety of configurations. Thus, the following more detailed description of the embodiments of the system and method of the present invention, as represented in the Figures, is not intended to limit the scope of the invention, as claimed, but is merely representative of presently preferred embodiments of the invention.

Figure 1:
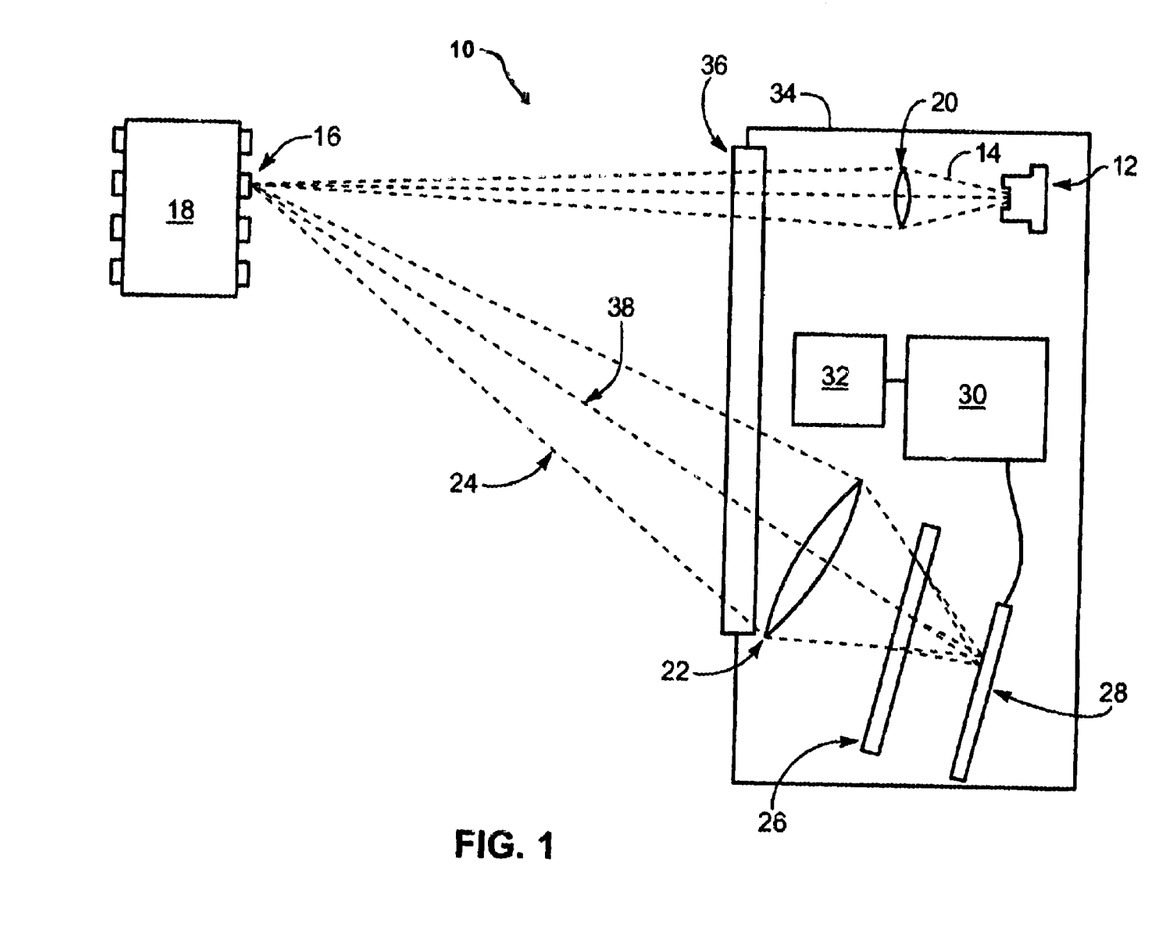
FIG. 1 is a schematic diagram of one embodiment of an apparatus of the present invention.

Referring to FIG. 1, a schematic diagram of one embodiment of a triangulaton sensor 10 of the present invention is shown. The sensor 10 is designed to focus light on a surface, collect reflected light, shape or homogenize the collected reflected light, and detect the reflected light. The sensor 10 includes a light source 12, such as a laser light source 12. In one preferred embodiment, the light source 12 generates a beam of projected light 14 which produces an illumination spot 16 on a surface 18. The light source 12 may be embodied as an edge-emitting laser diode or a vertical-cavity surface emitting laser (VCSEL).

The sensor further includes a focusing lens 20 disposed to intercept the beam of projected light 14 and focus the beam 14 to the illumination spot 16. As with most optical triangulation sensors, the invention herein disclosed has a minimum and maximum measurement range that is determined by the field of view of the collection lens and detector array. The beam 14 of projected light from the light source 12 is focused to a minimum size spot at or near the center of this range by the focusing lens 20.

VCSELs afford advantages in that they generate a circular, near-gaussian beam intensity profile, rather than the irregular intensity profile of an edge-emitting laser diode (see, for example, Honeywell HFE4084-322 Data Sheet). VCSELs also have lower beam divergence and lower intensity noise, and reduced power consumption relative to edge emitting laser diodes. The edge emitting diodes are presently available in a broader selection of power levels and wavelengths and with smaller emitting apertures. This may however change as VCSEL technology matures. Presently VCSELs suitable for use with the present invention are available.

The VCSEL lasers have a disadvantage relative to edge-emitting lasers in that they emit light from a larger area, or aperture, than the smallest aperture edge emitting lasers. A small laser source is generally considered desirable for triangulation point measurement systems because it provides a smaller illumination spot 16 at the target. However, it is possible to reduce the spot size at the target by increasing the distance between the light source 12 and the focusing lens 20. The distance can be increased to a greater degree than would be practical with an edge emitting laser because the VCSEL has a narrower divergence angle than edge emitting lasers. Thus, the focusing lens 20 may be placed farther from the VCSEL light source 10 without losing large amounts of laser output around the edge of the focusing lens 20 or without using a larger lens.

It is desirable to keep the focusing lens 20 small so that the spot 16 is small throughout the measurement range. A large lens results in a small spot 16 at the focal point, but the spot size grows more rapidly at closer or more distant ranges because it is starting from a larger diameter. The VCSEL may be one such as the HFE4084-322 sold by Honeywell.

When the surface of an object 18 is introduced into the path of the beam 14, light is reflected from the surface 18. The sensor 10 may further include a collection lens 22 which is disposed to collect a portion of the reflected light 24. The collected reflected light 24 converges and passes to a beam shaping optic 26.

The beam shaping optic 26 is configured to shape or diffuse the beam 24 by redistributing or homogenizing the beam 24 as it converges to a small region on a detector 28. The beam shaping optic 26 may therefore be embodied as holographic beam shaping element to shape the beam 24 or as a holographic diffuser to diffuse the beam 24. The beam shaping optic 26 may also be embodied as a diffuser or homogenizer that is not holographic in nature. In the embodiment shown, the beam shaping optic 26 may be disposed between the collection lens 22 and a detector 28. Nevertheless one of skill in the art will appreciate that the beam shaping optic 26 may be placed at any point in the path between the spot 16 and the detector 28.

The beam shaping optic 26 may be configured to enlarge the image of the spot 16 on the detector 28. The enlarged spot image may cover more than one pixel on the detector 28 and have a smooth intensity distribution. Commercially available beam shaping optics 26 are available with various optical properties that may be controlled. One optical property is diffusion angle, or the amount of spreading of the reflected light 24. Another optical property is intensity distribution, or the profile of the output intensity across the diffusion angle for a uniform input beam. In the present invention, diffusion angles of 0.5 degrees and one degree and gaussian intensity distributions are found to give good results for the purposes of determining the centroid of the spot 16.

Beam shaping optics 26 with other intensity distributions are also available. The output shapes do not need to be circular. They may be elliptical, so that where the detector 28 is a linear detector array, reflected light 24 from the surface 18 may be spread only in the direction of the pixels. This prevents spreading of light in the direction perpendicular to the array where it would be lost, reducing sensitivity of the sensor 10. Several types of beam shaping optics may be used, such as those manufactured by MEMS Optical of Huntsville, Ala.

The detector 28 may comprise a plurality of pixels and, in one embodiment, may include a single row of light sensitive pixel elements. The detector 28 generates electronic signals indicative of the illuminated pixels which in turn reflects the location of the spot 16. The detector 28 may be embodied as a CMOS linear array camera, which offers several advantages over the commonly used CCD cameras.

The detector 28 is in electrical communication with a processor 30 and provides electronic signals to the processor 30. During an exposure, one or more pixels in the detector 28 may be exposed to reflected light 24 through the collection lens 22 and diffuser 26. Reflected light 24 from the spot 16 on the surface 18 appears as a bright area on the detector 28. The pixels in the detector 28 may store an amount of light collected during the exposure as electrical charges. The amount of light falling on each pixel during an exposure is converted to a digital value and transmitted to the processor 30. Above a threshold level, the pixel with the peak intensity is identified and assumed to be from the reflected light 24 from the spot 16. The adjacent pixels are analyzed and the centroid of the spot 16 may be calculated by the processor 30.

A calibration table for each sensor 10 may be created by moving a target surface 18 along a precision linear stage to numerous known distances along the measurement range of the system. These are then reduced one point per pixel using a linear least squares fit. The resultant distance value corresponding to each pixel is stored in a memory 32 in electrical communication with the processor 30.

When the sensor 10 is in use, the processor 30 accesses the calibration table in the memory 32 to obtain the values at the pixel on each side of the measured pixel location. The processor 30 then interpolates between the values to obtain a normalized distance value from 0–50000. This value is then scaled to obtain the actual distance. For example, if the measured centroid of the spot is at pixel 34.57, the distance values for pixels 34 and 35 are accessed and interpolated.

Figure 2:
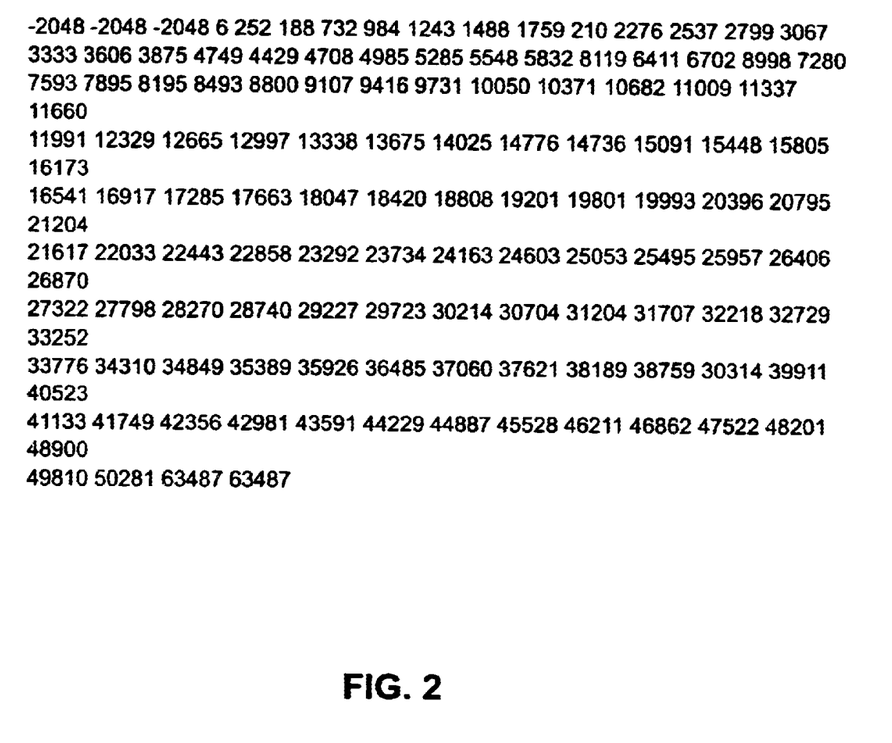
FIG. 2 is a typical calibration table.

Referring to FIG. 2, a typical calibration table, with normalized distance from 0 to 50000 is shown. A few pixels at each end of the array are not used and are given values outside the 0 to 50000 limits.

The measured distance may then be outputted by the sensor 10 in digital serial form and/or as an analog signal. The accuracy obtained is on the order of about $\frac{1}{10}$ of the width of a pixel. For each sensor 10 produced, a calibration table may be created as described above and loaded into the sensor 10. The precision stage is then used to check the calibration by moving to several hundred points and comparing the output of the sensor to the actual position. The accuracy is defined as a plus or minus error from the actual distance. On systems with detector arrays where 100 pixels are used, the accuracy is typically $\frac{1}{1000}$ of the full measurement range of the sensor, which is equivalent to $\frac{1}{10}$ of a pixel.

Figure 3:
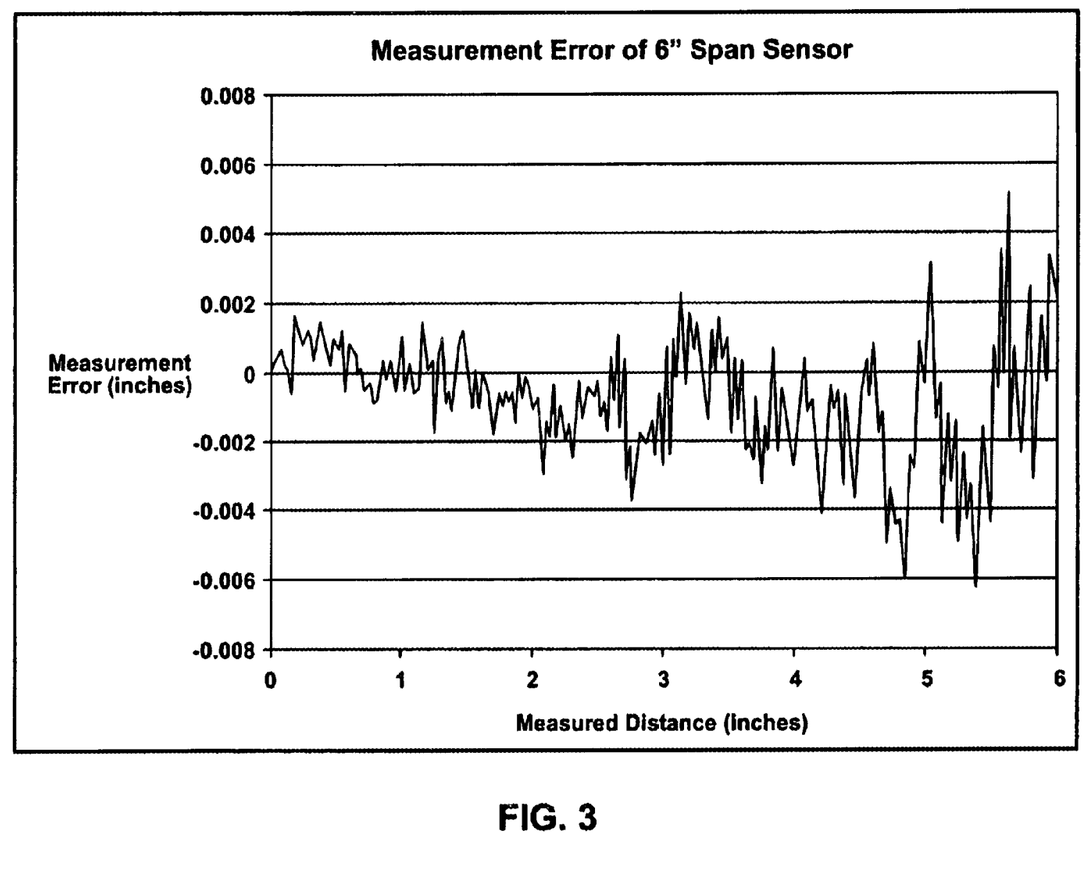
FIG. 3 is an error plot for a sensor having a six-inch measurement range.

Referring to FIG. 3, an error plot for a sensor with a six inch measurement range is shown. The plot shows a maximum error of +/−0.006 inches.

For accurate distance measurement it is often desirable to have the spot 16 on the target be as small as possible. When the spot 16 is imaged on the detector 28, as is typically done in triangulation sensors, this can result in the image of the spot 16 being smaller than a single pixel. Previous displacement sensors using an array of pixels in the detector have relied upon the image being larger than a single pixel to determine a centroid or center of gravity using the varying intensities on the illuminated pixels. This technique fails if the image is smaller than a single pixel because it is not possible to determine where on a pixel the image is falling.

The duration for which the light source 12 is turned on may be adjusted based on the apparent intensity at the detector 28 of the reflected light from the previous exposure. In this manner, the duration may be adjusted to obtain an optimum light level. In one embodiment, the duration of the light source may vary from five microseconds to 50 milliseconds. The detector 28 may have a useful dynamic range of 10 to 1 or better. This may result in a sensitivity range of over 100,000 to 1, from the strongest usable signal to the weakest.

The duration of the light source 12 may further be adjusted based on the ambient light to increase the resolution of the detector 28. In one embodiment, the detector 28 may take a "dark capture" of the ambient light when the light source 12 is off, as well as a capture when the light source 12 is on. The processor 30 may then subtract the ambient light data from the signal data to improve measurement calculations.

Figure 4:
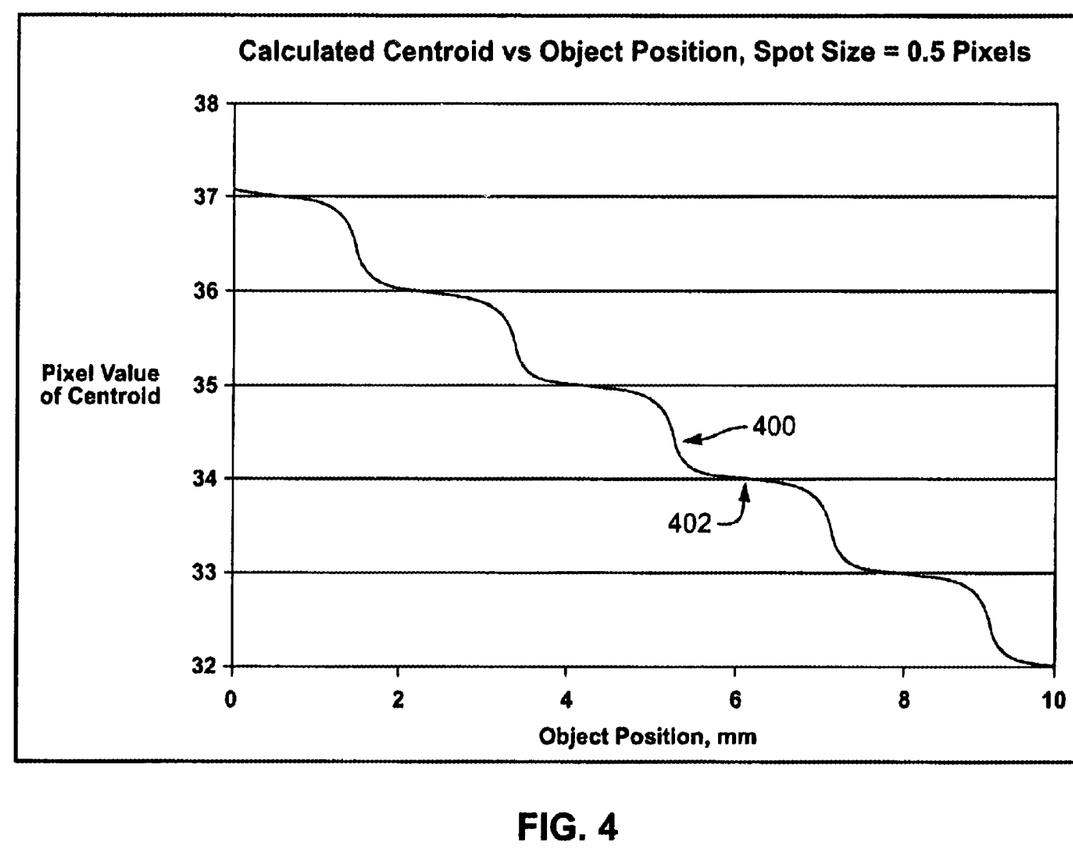
FIG. 4 is a graph of the calculated centroid of the light falling on a detector array as plotted against the actual object surface position, when the area of illumination is smaller than the size of a pixel.

Referring to FIG. 4, the computed centroid position plotted against the actual target position for an image size of 0.5 pixels is shown. The computed centroid position changes rapidly as the spot 16 moves between pixels, such as in region 400. When the entire spot 16 is on a single pixel, there is little or no change in the calculated centroid position such as in region 402 because there is little or no information available as to the location of the spot 16 within the pixel. The slight slope in region 402 is due to the weak fringes of the spot 16 falling on adjacent pixels. As the spot 16 is made smaller relative to the pixels, this plot approaches a stairstep function. This precludes obtaining an accurate measurement of the location of the spot 16 on the surface 18.

In one embodiment, the detector 28 may have pixels that are larger than the size that the spot image would be on the detector 28. As such, a spot image is not formed. Instead, the beam shaping optic 26 shapes or diffuses the beam 24 and thereby enlarges the spot image at the point where it strikes the detector 28. The enlarged spot covers more than one pixel and has a smooth intensity distribution.

There are several advantages to using relatively larger pixels if resolution can be maintained. First, fewer pixels need to be processed for a given array length, which increases the sample rate and typically reduces the cost of the detector 28 and the processing required. Also, using a relatively short array of pixels is optically inconvenient for sensors 10 with relatively larger measurement ranges as very short focal length optics are required, which limits their collection area and therefore collection power.

When beam shaping is used to enlarge the spot image size, the optimal amount of enlargement depends on the relative sizes of the spot and the pixels. Diffusing the spot image at the detector 28 to a width of two to four pixels provides good results. At narrower widths, the centroid algorithm begins to fail. At greater widths sensitivity and resolution are diminished because many pixels are illuminated.

Figure 5:
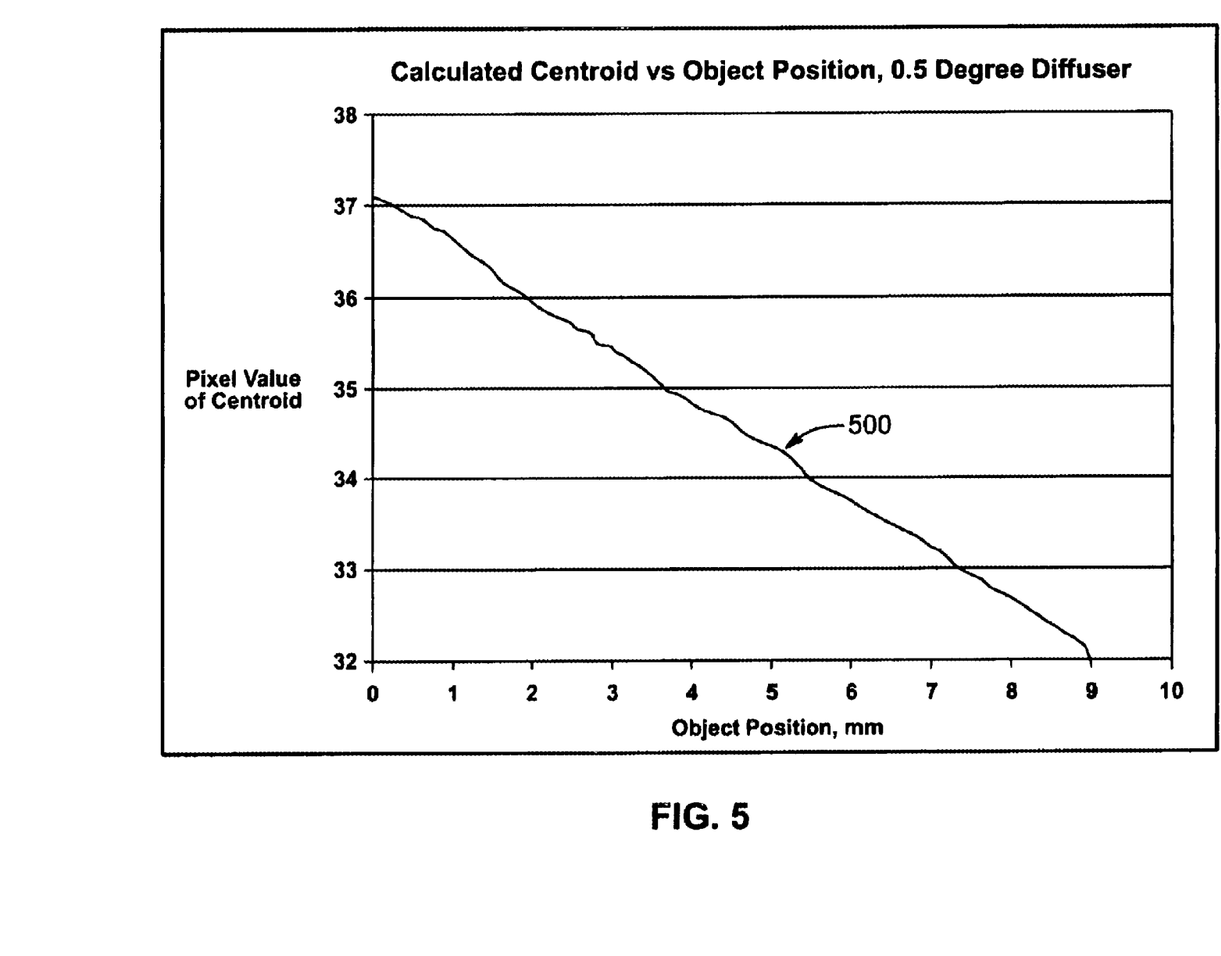
FIG. 5 is a graph of the calculated centroid of the light falling on the detector array as plotted against the actual object surface position when a diffuser has been used to create an area of illumination on the array with a gaussian distribution and a FWHM (Full Width Half Maximum) of approximately three pixels.

Referring to FIG. 5, the computed centroid position plotted against object surface distance, where a beam shaping optic 26 has been used to create a gaussian intensity profile with a width (Full Width Half Maximum) of approximately three pixels. As can be seen by the plotted data 500, the periodic non-linearity shown in FIG. 4 is nearly completely removed, greatly improving the subpixel resolution of the sensor.

Figure 6:
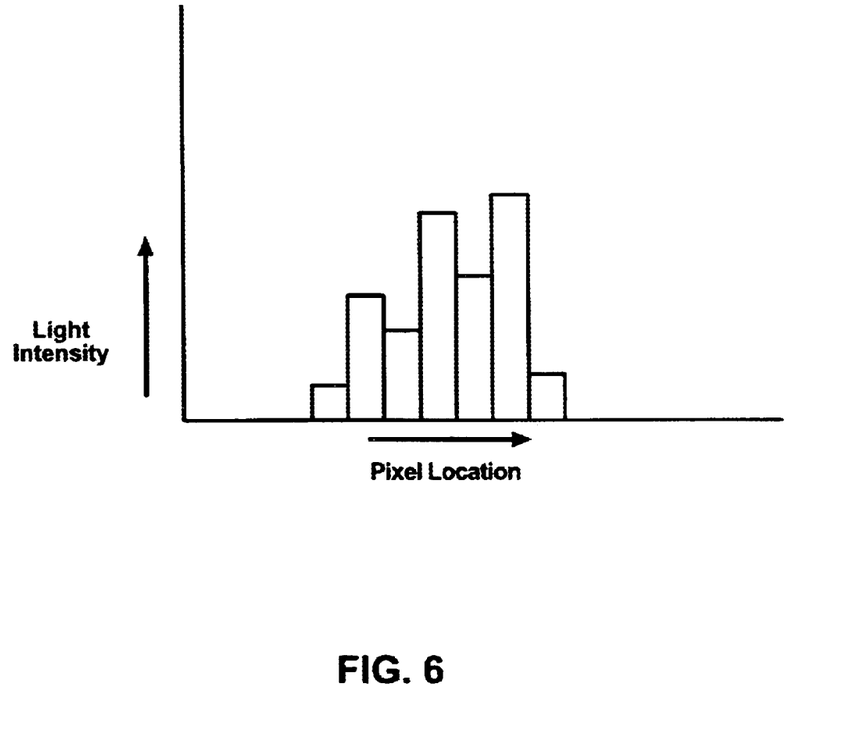
FIG. 6 is a graph of a typical intensity profile of a spot image as it would appear if imaged onto a detector array with pixels substantially smaller than the spot image.

Referring to FIG. 6, the intensity profile of a typical imaged spot as it appears on the surface of a linear detector is shown. The image intensity profile typically contains fluctuations, local maxima and minima in intensity. These are due to variations in object surface reflectance, laser spot intensity structure, and laser speckle. In the present invention, beam shaping or diffusing is used to greatly reduce these variations. It is desirable to minimize these variations so that calculation of the centroid of the illuminated area can be performed more easily and accurately. The shaping or diffusing of the beam 24 of reflected light by the beam shaping optic 26 has the effect of homogenizing the beam 24. Light from each portion of the beam 24 is scattered, or distributed, to all portions of the beam 24 after it has passed through the beam shaping optic 26.

Figure 7A:
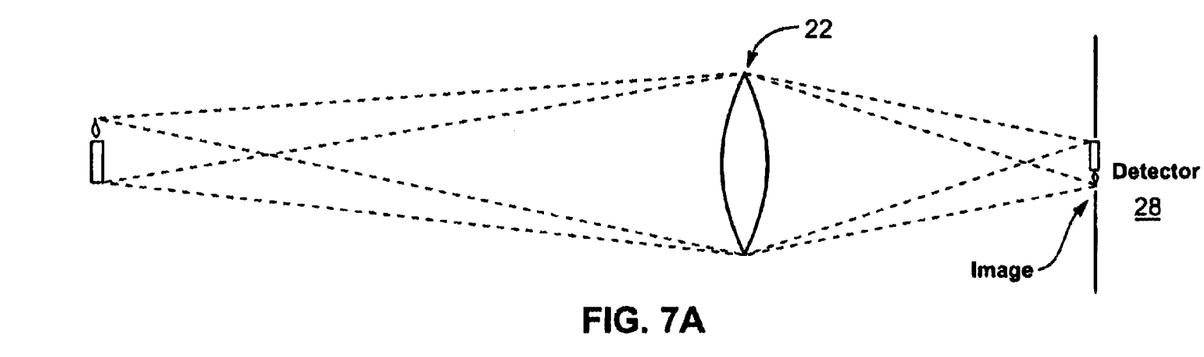
FIG. 7a is a schematic diagram of an intensity profile of the light falling on a detector array.
Figure 7B:
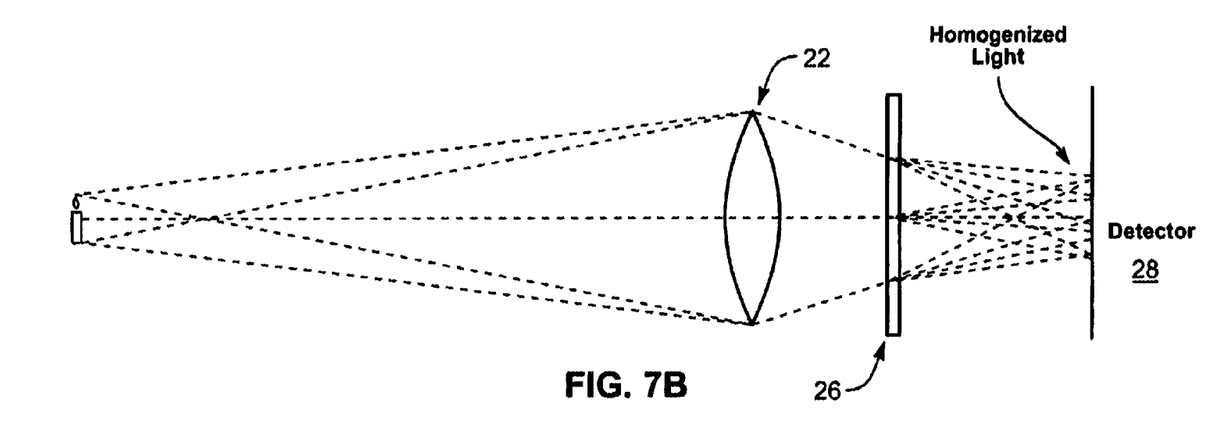
FIG. 7b is a schematic diagram of an intensity profile of the light falling on a detector array after being optically homogenized, where the array pixels are substantially smaller than the illuminated area.

FIGS. 7a and 7b illustrate the redistribution of the beam 24 of reflected light. In FIG. 7a, the details of the source, in this case the spot 16 on the surface 18, are preserved and duplicated on the detector 28 by the imaging process. Any variations in intensity across the spot 16 on the surface 18 therefore appear in the pixel data from the detector 28.

In FIG. 7b, light reflected from the surface 18 is passed through the beam shaping optic 26. The reflected light 24 is redistributed in the manner described above. This has the effect of forming an intensity profile at the detector 28 that is determined by the design of the beam shaping optic 26, thereby eliminating the intensity profile of the spot 16 on the surface 18. Because this intensity profile is the image of the spot 16, the information required for image formation is destroyed and no image is formed.

Figure 8:
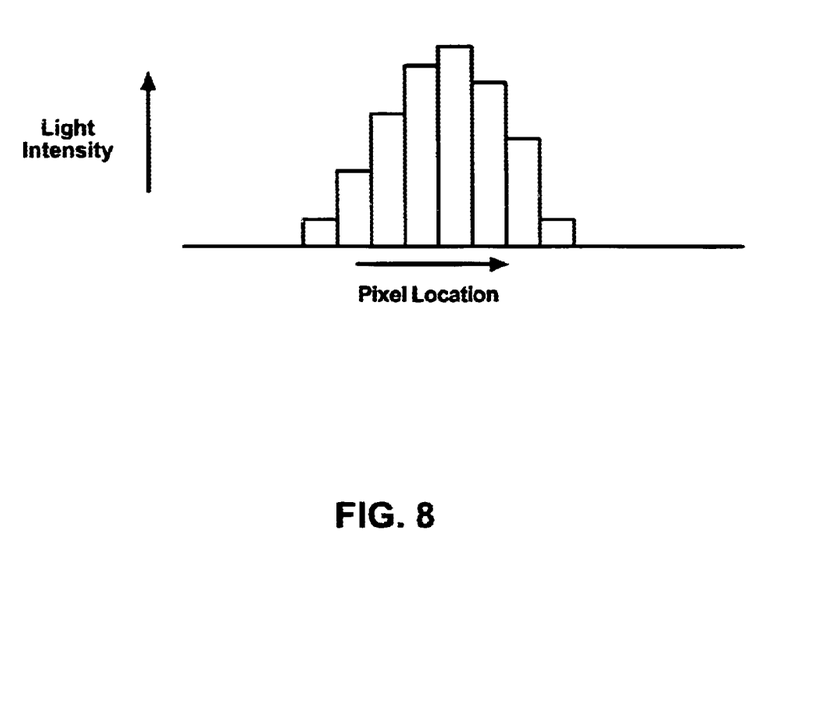
FIG. 8 is a graph that shows an optical homogenization process, as performed by a diffusing element, in which the distribution of light from an object surface differs from the distribution obtained with imaging optics.

Referring to FIG. 8, a typical intensity profile of a spot 16 shaped with a beam shaping optic 26, such as a holographic diffuser, is shown. The structure of the spot 16 is almost completely removed, and the centroid of the smoother profile, relative to FIG. 6, is easily computed.

The beam shaping optic 26 in the present invention is therefore used for two purposes. First, it serves to remove unwanted intensity structure from the reflected light 24 falling on the detector 28. Second, it may enlarge the size of the illuminated area on the detector 28, thereby allowing the use of relatively larger pixels. It should be noted that the beam shaping optic 26 can serve either or both of these functions. This provides advantages in detectors 28 with smaller pixels where it is desired to remove structure from the spot 16, or in sensors with larger pixels where enlargement of the illuminated area is desired, or where both effects are desired.

In one embodiment, the detector 28 may be embodied as a CMOS type camera having multiple pixels. Conventional triangulation sensors that include detectors use or have used photodiode arrays, typically constructed with control circuitry into a device known as a CCD array. By contrast, a CMOS detector uses an array of photosensitive capacitors which accumulate charge when exposed to light.

There are several advantages to using a CMOS detector 28 in the sensor 10. CMOS detectors can have extensive digital and analog processing logic on the same chip as the detector elements. Thus, the commercially available products are much simpler in terms of power requirements, control, and data collection than CCD arrays. CCD arrays are manufactured with a specialized process that prevents on-chip incorporation of extensive logic and control functions.

CMOS detectors also suffer from some disadvantages relative to CCD detectors, primarily in the area of noise and sensitivity. One aspect of the CMOS detectors that is of concern in triangulation range finding is referred to as fixed pattern noise. This results from individual pixels having varying degrees of sensitivity to light. This is a fixed characteristic of each pixel that does not change over time. If uncorrected, this results in measurement errors that are significant at the level of accuracy otherwise attainable.

The calibration process described above greatly reduces the effect of fixed pattern noise. A pixel with higher than average sensitivity will generate a larger signal for a given amount of light. When such a pixel is exposed to one portion of the illuminated area on the array, the voltage output of that pixel will be higher than average, causing a shift in the centroid position calculation. If this is not compensated for, an error in the indicated surface position will result. The calibration process takes 30 sample points per pixel and records the actual distance and the indicated centroid position at each point.

Figure 9A:
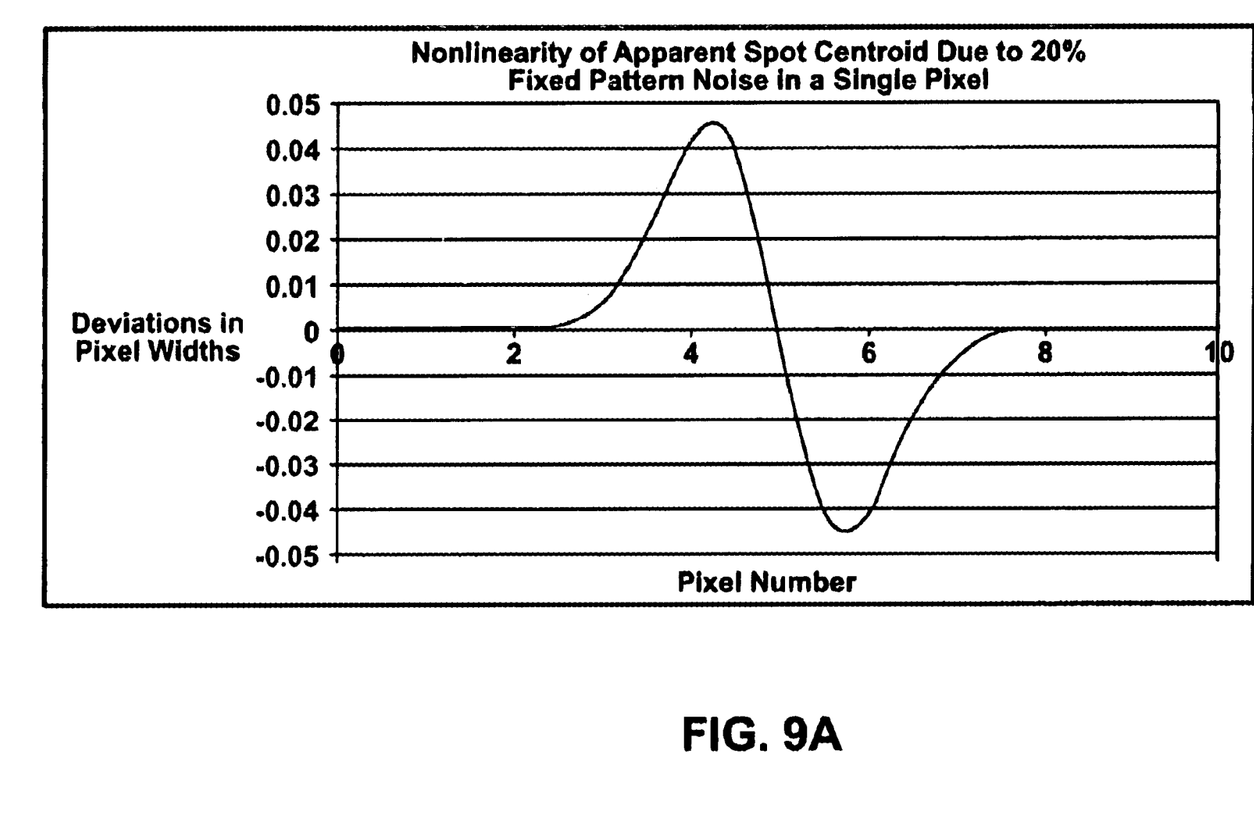
FIG. 9a is a graph that shows how a pixel with 20% greater sensitivity than adjacent pixels affects the calculated centroid position.

Referring to FIG. 9a, a pixel with 20% greater sensitivity than adjacent pixels is shown how it affects the calculated centroid position. This causes a non-linearity in the region around the pixel that extends over a region covering a few pixels in width.

Figure 9B:
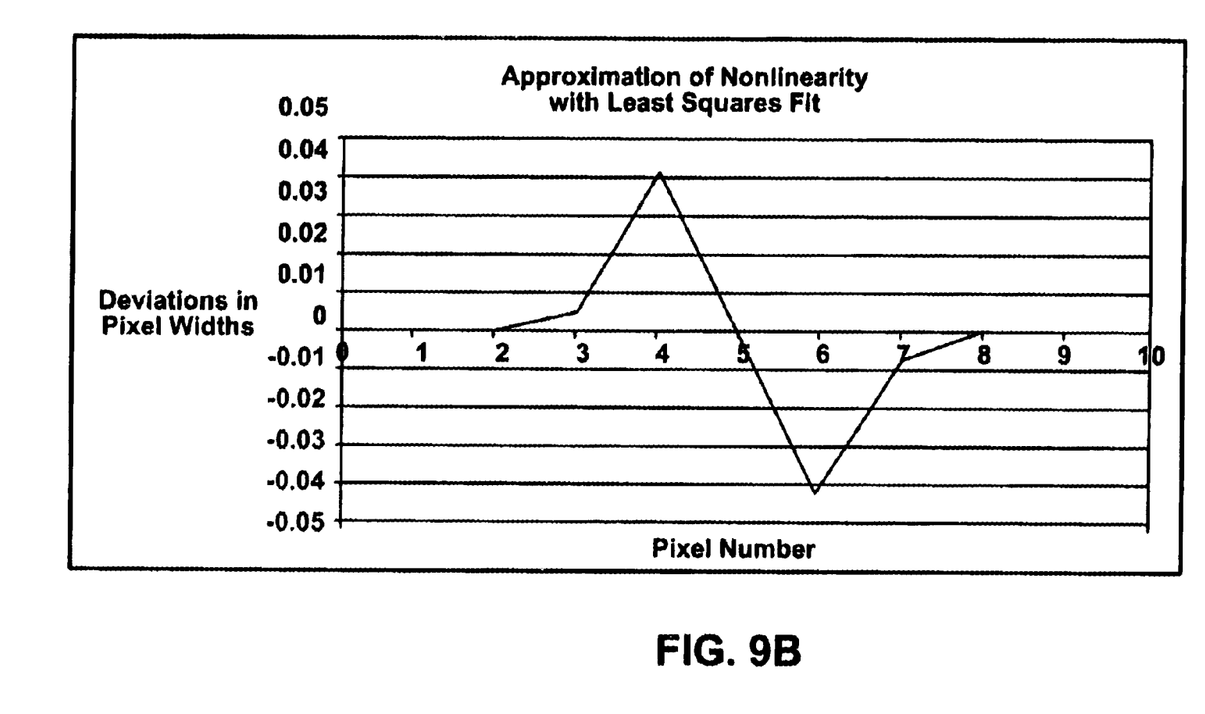
FIG. 9b is a graph that shows the least squares fit of the measured data that is used to create the calibration data.

Referring to FIG. 9b, the least squares fit of the measured data used to create the calibration data for FIG. 9a is shown. This compensates for the non-linearity and since fixed pattern noise is unchanging over time, the compensation will be effective when the table is used to convert centroid position to distance during use of the sensor 10. It is also expected that advances in CMOS detector technology will improve the performance.

Referring once again to FIG. 1, the sensor 10 is further illustrated with a housing 34. The housing 34 is configured to support and contain components of the sensor 10 in a fixed configuration. In this manner, the geometrical relationships of the light source 12, the focusing optic 20, the collection lens 22, the beam shaping optic 26, and the detector 28 may be maintained.

The sensor 10 may further include a window 36 that is disposed and configured to allow passage of the projected light 14 and the reflected light 24. An advantage of the present invention is the use of a single window 36 to accommodate the projected and reflected light 14, 24 rather than two windows. A sensor with two windows may become misaligned when one or both windows undergo shifts in their positions relative to one another. Shifting may occur when the housing and windows are subject to external stresses or if the adhesives fail to some degree. With a single window 36, a shift does not cause a misalignment between passageways for the projected and reflected light 14, 24. Rather, the realignment occurs for both passageways.

The window 36 may further be coated with a anti-reflective coating to reduce spurious light. In one embodiment both sides of the window 36 may be coated with an optic enhancing coating to enhance passage of the projected and reflected light 14, 24. The coating may allow passage of certain wavelengths such as those of the projected and reflected light 14, 24 and inhibit passage of other wavelengths. Such coatings are known by those of skill in the art.

An additional feature of the present invention is that the window 36 may be mounted non-perpendicular relative to the optical axis 38 of the collection lens 22. As the reflected light 24 passes through the window 36, some of light will reflect off the surfaces of the window 36. Some of these reflections generated in the interior of the window 36 may ultimately exit in the direction of the collection lens 22. Because of the non-perpendicular mounting of the window 36, the reflections generated within the window 36 are shunted from the collection lens 22.

It should be noted that the use of beam shaping optics 26, detectors 28 with pixel elements larger than the image of a spot 16 on a surface 18, CMOS detectors 28 and VCSELs 12 may be applied to systems that use triangulation to determine the location of either one or multiple points on a surface 18 without affecting the principles and their usefulness as described here. For example, there exist triangulation systems that use area array CCDs rather than linear array CCDs, and systems that use projected lines, multiple spots, or other patterns of light rather than spots. These systems typically determine the locations of several points on a surface 18, but the principles of optical triangulation are the same as described herein. The advantages of the modifications described herein would apply equally to these devices. It should also be noted that these three improvements may be used together or separately without detracting from the value or principle of each.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for determining the position of a location on a surface, comprising:

a light source to project light to the location on the surface;

a collection lens to receive reflected light from the surface;

a beam shaping optic to homogenize the reflected light to thereby substantially eliminate variations in the reflected light; and a detector disposed to receive the reflected light, detect an area of illumination generated by the reflected light, the area of illumination being substantially free of variations and generate a signal indicative of the location.

2. The apparatus of claim 1, further comprising a housing having a window, wherein the window is configured to pass projected and reflected light.

3. The apparatus of claim 2, further comprising an anti-reflective coating disposed on the window.

4. The apparatus of claim 3, wherein the coating is configured to enhance passage of projected and reflected light through the window.

5. The apparatus of claim 2, wherein the window is disposed non-perpendicular to an optical axis of the collection lens.

6. The apparatus of claim 1, wherein the detector comprises a CMOS detector having a plurality of pixels.

7. The apparatus of claim 1, wherein the light source comprises a VCSEL laser light source.

8. The apparatus of claim 1, wherein the beam shaping optic is configured to enlarge the reflected light.

9. A method for determining the position of a location on a surface, the method comprising:

projecting light to the surface;

disposing a collection lens to collect reflected light from the surface;

disposing a beam shaping optic to homogenize the reflected light to thereby substantially eliminate variations in the reflected light; and detecting an area of illumination generated by the reflected light, the area of illumination being substantially free of variations.

10. The method of claim 9, further comprising:

passing the projected light through a window; and passing the reflected light through the window.

11. The method of claim 10 further comprising disposing an anti-reflective coating on the window, wherein the coating is configured to enhance passage of projected and reflected light through the window.

12. The method of claim 10 further comprising disposing the window in a non-perpendicular orientation relative to an optical axis of the collection lens.

13. The method of claim apparatus of claim 9, wherein detecting an area of illumination is performed by a CMOS detector having a plurality of pixels.

14. The method of claim 13, further comprising configuring the beam shaping optic to enlarge the reflected light to thereby illuminate a plurality of pixels.

15. The method of claim 9, wherein projecting the light is performed by a VCSEL laser light source.

* * * * *